United States Patent
Hofer et al.

(10) Patent No.: US 7,953,638 B2
(45) Date of Patent: May 31, 2011

(54) METHOD AND APPARATUS FOR REACHING SMALL MARKETS WITH A CULTURE SPECIFIC ON-LINE COMMERCE SERVICE

(75) Inventors: Petra Hofer, San Jose, CA (US); Chenggang Luan, San Jose, CA (US); Tola Dalton, San Jose, CA (US); Krishna Somayajula, Sunnyvale, CA (US); Peter Johnson, Santa Cruz, CA (US); Masaki Sawanobori, San Jose, CA (US)

(73) Assignee: eBay Inc., San Jose, CA (US)

( * ) Notice: Subject to any disclaimer, the term of this patent is extended or adjusted under 35 U.S.C. 154(b) by 685 days.

(21) Appl. No.: 10/741,092

(22) Filed: Dec. 19, 2003

(65) Prior Publication Data
US 2005/0075942 A1      Apr. 7, 2005

(51) Int. Cl.
  *G06Q 30/00*    (2006.01)
(52) U.S. Cl. ............................................ 705/26; 705/37
(58) Field of Classification Search .................... 705/26, 705/37
  See application file for complete search history.

(56) References Cited

U.S. PATENT DOCUMENTS

| | | |
|---|---|---|
| 6,233,545 B1 | 5/2001 | Datig |
| 6,334,101 B1 | 12/2001 | Hetherington et al. |
| 6,345,243 B1 | 2/2002 | Clark |
| 6,363,337 B1 | 3/2002 | Amith |
| 6,385,586 B1 | 5/2002 | Dietz |
| 6,604,107 B1 | 8/2003 | Wang |
| 7,013,289 B2 * | 3/2006 | Horn et al. ...................... 705/26 |
| 2002/0023654 A1 | 2/2002 | Webb |
| 2002/0035450 A1 * | 3/2002 | Thackston ........................ 703/1 |
| 2002/0077805 A1 | 6/2002 | Hecht et al. |
| 2002/0087301 A1 | 7/2002 | Jones et al. |
| 2003/0005159 A1 | 1/2003 | Kumhyr |
| 2003/0115572 A1 * | 6/2003 | Zondervan et al. ........... 717/109 |

(Continued)

FOREIGN PATENT DOCUMENTS

WO   WO-0201387   1/2002

(Continued)

OTHER PUBLICATIONS

Unicode 1.0 (1991)-5.1 (2008). http://en.wikipedia.org/wiki/Unicode. Downloaded from the Internet on Dec. 10, 2007.*

(Continued)

*Primary Examiner* — James Zurita
(74) *Attorney, Agent, or Firm* — Schwegman, Lundberg & Woessner, P.A.

(57) ABSTRACT

A method is described that comprises providing a cultural specific on-line commerce experience for an end user by translating an action of the end user into a standard format used by an on-line auctioneer and by causing the translated action to be sent over a network. The action is taken through a cultural specific end user interface. The standard format is used by an on-line commerce service's back end application software to recognize end user actions originating from experiences that include the cultural specific on-line experience as well as experiences other than the cultural specific on-line experience.
The action that is translated into the standard format is to be sent into a network so that it can be received by the on-line commerce service's back-end resources and recognized by the back-end application software.

20 Claims, 8 Drawing Sheets

U.S. PATENT DOCUMENTS

2004/0103040 A1* 5/2004 Ronaghi et al. ............... 705/26
2005/0043941 A1* 2/2005 Janakiraman et al. .......... 704/10

FOREIGN PATENT DOCUMENTS

| WO | WO-0201400 A1 | 1/2002 |
| WO | WO-0233618 A1 | 4/2002 |
| WO | WO-02088977 A1 | 11/2002 |
| WO | WO-03040951 A1 | 5/2003 |

OTHER PUBLICATIONS

Internationalization and localization, http://en.wikipedia.org/wiki/Internationalization_and_localization, downloaded from the Internet on Dec. 10, 2007.*

Computer-human Interaction, http://en.wikipedia.org/wiki/Human-computer_interaction, downloaded from the Internet on Dec. 10, 2007.*

SDL International: cognitas chooses SDL's Translation Memory System, M2 Presswire, Coventry, Sep. 25, 2001, downloaded from ProQuest on the Internet on Jul. 19, 2009, 5 pages.*

SDL International Begins Trading on the London Stock Exchange, PR Newswire, New York, Dec. 8, 1999, downloaded from ProQuest Direct on the Internet on Jul. 19, 2009, 4 pages.*

SDL International: Compendium selects SDL International to deliver support for new multilingual portal, M2 Presswire, Coventry, Nov. 14, 2001, downloaded from ProQuest Direct on the Internet on Jul. 19, 2009, 3 pages.*

Vickers, Firms Give Global Web Businesses Local Appeal, Wall Street Journal (Eastern Edition), New York, Dec. 4, 2000, downloaded from ProQuest Direct on the Internet on Jul. 19, 2009, 4 pages.* eTranslate Secures Additional $18 million to expand its position as market leader and Invest in Latest Globalization Technology, PR Newswire, New York, Dec. 4, 2001, downloaded from ProQuest Direct on Jul. 19, 2009, 4 pages.*

Web Crossing, Inc. Announces Team Crossing 2.0, Host Interfaces Completely Localizable. Business Editors, High-Tech Writers, Business Wire, New York, Jun. 5, 2002, downloaded from ProQuest Direct, Jul. 19, 2009, 4 pages.*

"European Application Serial No. 03818976.7, Office Action mailed Jun. 20, 2008", 6 pgs.

"European Application Serial No. 03818976.7, Supplementary European Search Report mailed Dec. 28, 2007", 4 pgs.

"International Application Serial No. PCT/US03/31735, International Search Report mailed Feb. 8, 2005", 6 pgs.

"International Application Serial No. PCT/US03/31735, Preliminary Examination Report mailed Aug. 3, 2006", 4 pgs.

"International Search Report for Application No. PCT/US2003/031735, date mailed Feb. 8, 2005", 6 pgs.

200380110502.X, Chinese Application Serial No. 200380110502.X, Office Action mailed Apr. 3, 2009, 7 pgs.

* cited by examiner

METHOD AND APPARATUS FOR REACHING SMALL MARKETS WITH A CULTURE SPECIFIC ON-LINE COMMERCE SERVICE

The present patent application claims the priority benefit PCT Application No. PCT/US03/31735 filed Oct. 6, 2003, which is incorporated by reference.

FIELD OF INVENTION

The field of invention relates generally to on-line commerce; and, more specifically, to a method and apparatus for reaching small markets with a culture specific on-line commerce service.

BACKGROUND OF THE INVENTION

Figure 1:
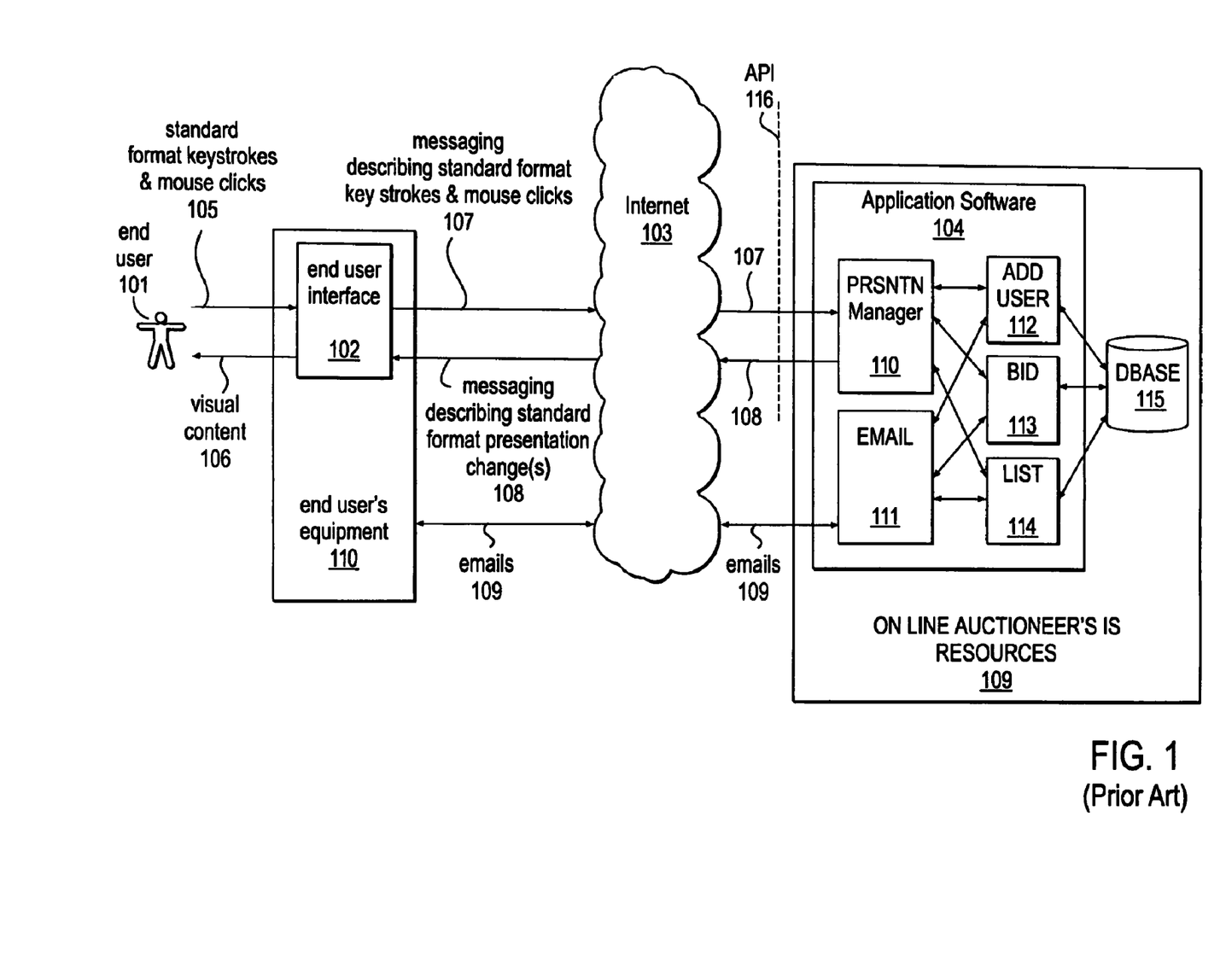
FIG. 1 (prior art) shows on-line auction service architecture.

FIG. 1 illustrates a prior art on-line commerce service architecture in which the principle manner of commerce is auctioning. According to the architecture of FIG. 1, the on-line auctioneer provides the ability for an individual to list an item for sale on the Internet 103; and, for those having interest in purchasing the listed item, the ability to submit a bid for the listed item over the Internet 103. The on-line auctioneer further resolves multiple bids for a same item and determines which bidding party is deemed to be the purchaser of the item. The application software of the on-line auctioneer that is responsible for listing the items to be sold and determining the winning bid for each listed item can be viewed as part of the on-line auctioneer's Information Science (IS) resources 109. Such IS resources are often referred to as the on-line auctioneer's "back-end" resources.

Because of the high volume of both listed items and submitted bids that is achievable through the Internet 103, the on-line auctioneer's back-end resources 109 are apt to include clusters of high performance computing systems (e.g., mainframes and/or workstations). By contrast the equipment 110 used by an end-user 101 (e.g., an individual who lists an item to be sold and/or submits bids for a listed item) is apt to be lower performance computing system (e.g., a personal computer (PC), notebook/laptop, or handheld device). The prior art mechanics of the communications that take place between the end-user 101, the end-user's equipment 110 and the on-line auctioneer's IS resources 109 are depicted in the architecture of FIG. 1.

According to the depiction of FIG. 1, the end-user makes keystrokes and mouse clicks (or the equivalent thereof) that are interpreted by an end user interface 102. In a typical approach, the end user interface 102 is a modest software routine that is downloaded to the end user's equipment 110 over the Internet 103 by the on-line auctioneer's IS resources 109 in response to the end-user 101 having made an HTTP request to the on-line auctioneer's home page. The end user interface 102 is responsible for converting the end-user's keystroke and mouse-click sequences into appropriate messages 107 that are sent over the internet 103 toward the auctioneer's application software 104.

Typically, the application software 104 can be viewed as having an application programmer's interface (API) 116 at the network interface; where, the API includes commands dedicated for communication between the end-user and the auctioneer (e.g., "Bid", "Sell", "Register", etc.). As such, the messaging 107 sent by the end user interface 102 corresponds to network communications (e.g., one or more packets) that describe the end user's activity in API compatible terms. For example, the specific sequence of keystrokes and mouse clicks that correspond to the user's attempt to make a bid invokes the "Bid" command. Invocation of the Bid command (and perhaps associated information) is effectively packetized by the end-user interface 102 and sent over the Internet 103 to the auctioneer's application software 104.

The on-line auctioneer's application software 104 controls the end-user's presentation experience (as suggested by presentation manager 110. In so doing, messaging 108 describing changes to the user's presentation experience (e.g., a new web page for viewing) are sent over the Internet 103 from the auctioneer's application software 104 to the end-user's equipment 110. The messaging 108 may be implemented as one or more packets that are formatted to describe the presentation changes as API compatible information. The end-user interface 102 (which typically includes a graphical user interface (GUI)) presents visual content 106 to the end user so as to make the presentation change(s) visually apparent. As discussed in more detail below, emails 109 may also be exchanged between the end-user and the auctioneer's application software (noting that functions such as an email server 111 may be deemed part of the auctioneer's application software 104 for purposes of convenience).

Figure 2A:
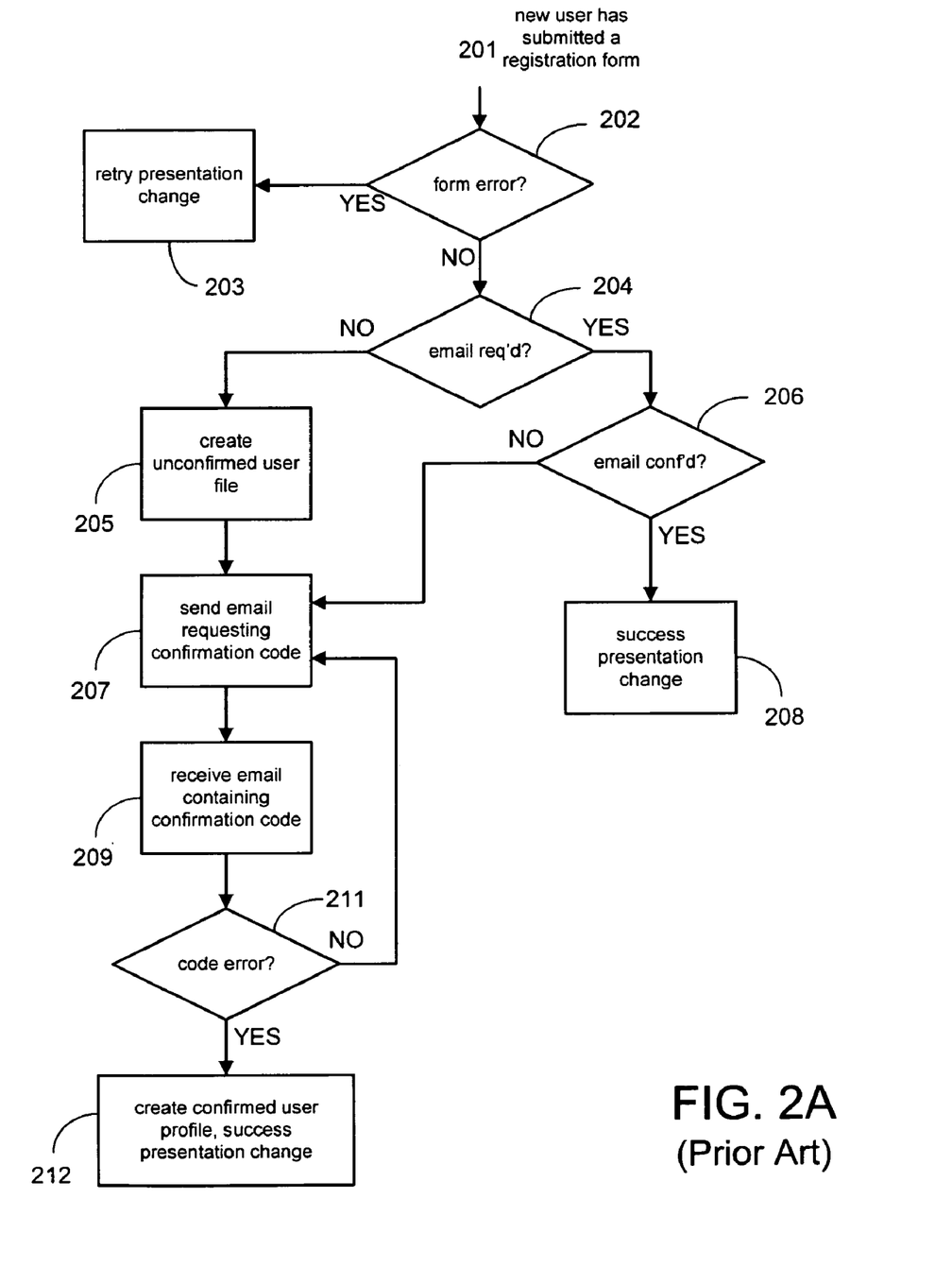
FIG. 2a (prior art) shows a registration methodology.
Figure 2B:
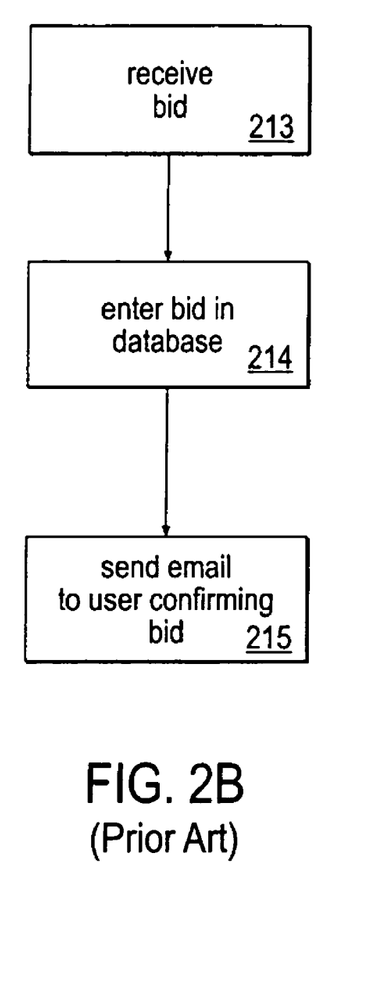
FIG. 2b (prior art) shows a bidding methodology.
Figure 2C:
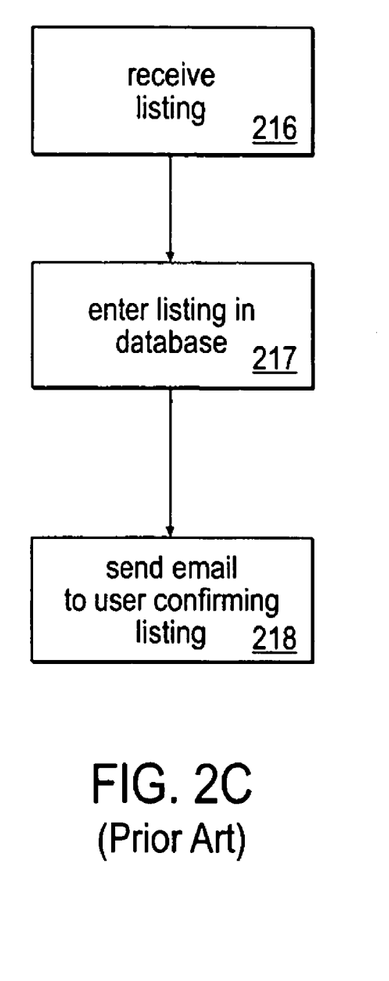
FIG. 2c (prior art) shows a selling methodology.

FIGS. 2a through 2c demonstrate some prior art process flows that can be executed by the auctioneer's application software. FIG. 2a shows a registration process that can be viewed as being executed by the "add user" component 112 of the application software, FIG. 2b shows a bidding process that can be viewed as being executed by the "bidding" component 113 of the application software; and, FIG. 2c shows a listing or selling process that can be viewed as being executed by the "listing" component of the application software. Each of these components 112, 113, 114 are drawn as being coupled to some form of database resources 115.

According to the registration process of FIG. 2a, the standard course of procedure is to have an end user send a 'filled out' registration form 201. If the form has an error 202, presentation change messaging 203 is sent to the end user that notifies the end user that the registration attempt was unsuccessful and should be retried. If the registration form is filled out properly an inquiry 204 is made to see if the particular end user has already been "email registered".

Email registered means that a file exists within the archives of the auctioneer for the end-user which includes the user's email address. If the user is not email registered (i.e., if no email is recorded for the end user) an unconfirmed user file that includes the user's email address is created 205 (note that, in one embodiment, the user's email address is found in the properly filled out form). If the user is email registered an inquiry 206 is made to see if the end-user is "email confirmed". Email confirmed means that a code that is specific to the end-user is successfully received by the auctioneer via email from the end user.

If the user is also email confirmed, presentation change messaging 208 is sent to the end-user indicating that the registration process has previously been successfully. If the user is either not email registered or not email confirmed the auctioneer sends 207 an email to the end user that asks the end user to send his/her code via email (in one embodiment, the password is first included in the filled out form and the email exchange is performed to confirm the code). Upon receipt of the return email from the end-user 209, an inquiry 211 is made to see if the code is correct. If not, another email is sent to the end-user requesting the code 207. If so, a confirmed user file is created 212.

Referring to FIG. 2b, if a bid is received from an end user and is correctly referenced to the end-user's code 213, the bid is entered in a database 214 and an email is sent to the end-user that confirms that the bid has been entered in the auctioneer's system 215. Referring to FIG. 2c, if a sales listing is received from an end user and is correctly referenced to the end-user's code 216, the sales listing is entered in a database 217 and an email is sent to the end-user that confirms that the bid has been entered in the auctioneer's system 218.

BRIEF DESCRIPTION OF THE DRAWINGS

The present invention is illustrated by way of example, and not limitation, in the Figures of the accompanying drawings in which.

DETAILED DESCRIPTION

While the exemplary embodiment of the present invention is described below in the context of an on-line auction system, it will be appreciated that at least certain aspects of the invention (e.g., registration processes among possible others) may of course be implemented as part of any electronic, network-based, or automated commerce system, which may or may not support an auction-style price sitting mechanism. As such, the present application discloses matter directed more generally to commerce systems as well as in particular to on-line auctioning.

With respect to the prior art on line auctioning service architecture observed in FIG. 1, note that the messaging 107 sent by the user interface 102 describes "standard format" key strokes and mouse clicks 105; while, the messaging 108 sent by the auctioneer's application software 104 describe "standard format" presentation change(s). Here, the phrase "standard format" invokes the notion that only a single type of presentation experience is provided to an end-user. For example, the "standard format" presentation experience may describe all communications, menu options, instructions, etc. in the English language.

A single, "standard format" presentation experience neglects the full potential of the Internet's reaches, however. That is, as the Internet 103 is able to reach different peoples of different languages and cultures, having a "standard format" user presentation tends to eliminate as potential users of the on-line auctioning service those individuals who cannot read or write in the language employed by the "standard format" (e.g., English). Being able to provide a presentation experience that is tailored for a particular culture or other demographic (e.g., as measured by language, presentation design, etc.) should help to expand the potential user base of the on-line auctioning service.

Figure 3:
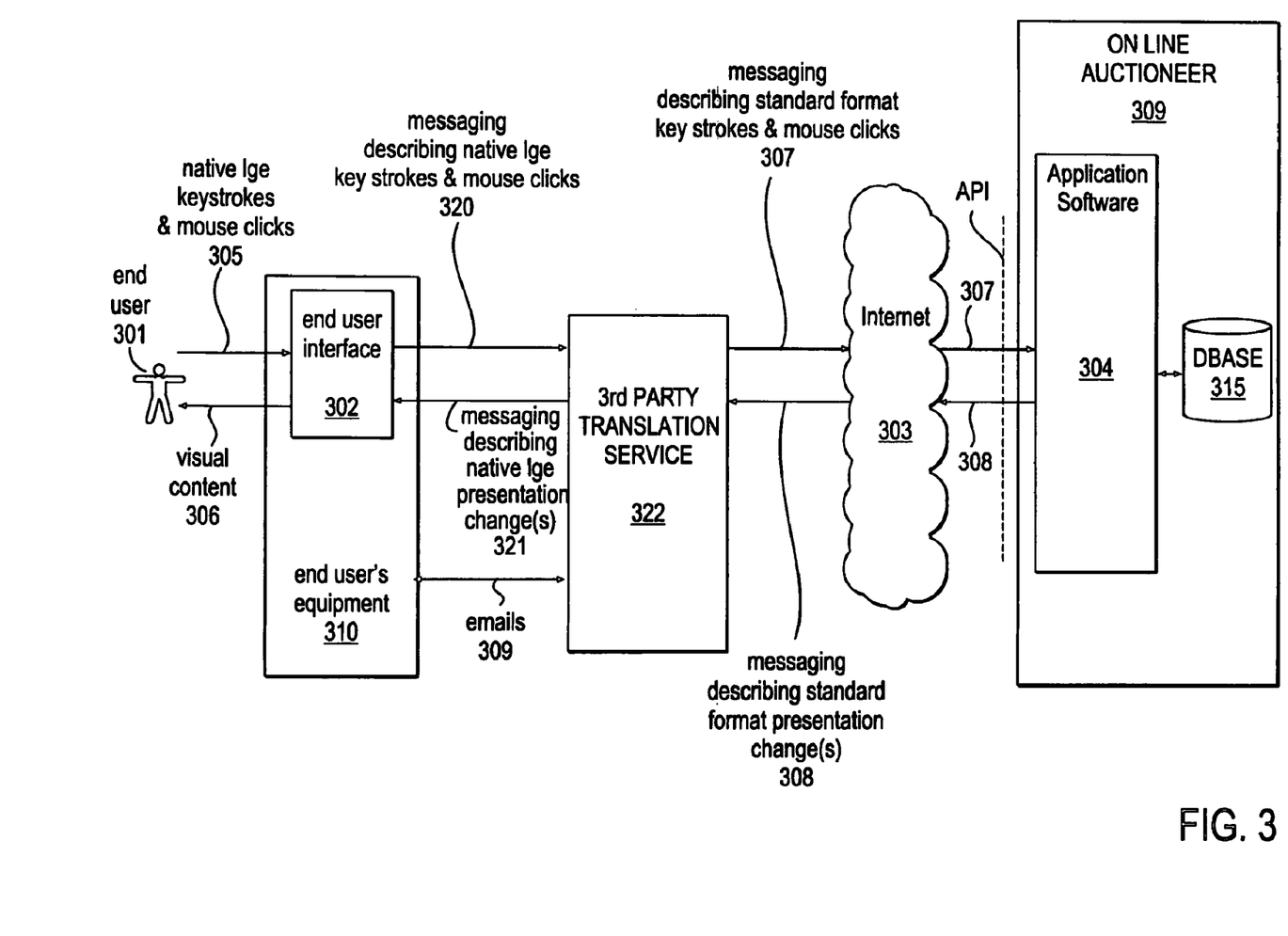
FIG. 3 shows an on-line auction service architecture that lends itself to reaching peoples of different cultures in their native language.

However, managing a wealth of different presentation experiences with the application software's presentation manager 110 may complicate the design and complexity of the application software 104 (e.g., the presentation manager component 110) to the point where supporting cultural specific experiences causes a bottleneck in the performance of the overall on-line service. FIG. 3 shows an architecture that distributes translation services 322 towards those end users who seek to interface with the on-line auctioneer 309 through an interface other than the standard format. By translating between a non standard user presentation experience and the on-line auctioneer's standard presentation experience, the "$3^{rd}$ party" translation service 322: 1) helps to reach those who would not use the on-line auctioning service were it not for the non standard experience; and, 2) keeps the additional burden placed on the on-line auctioneer's application software 304 manageable (because the application software maintains operation through its standard API).

According to the architecture of FIG. 3, the end-user makes "native language" keystrokes and mouse clicks 305 (or the equivalent thereof) that are interpreted by an end user interface 302. In a typical approach, the end user interface 302 is a modest software routine that is downloaded to the end user's equipment 310 by the $3^{rd}$ party translation service 322 (e.g., note that networking infrastructure is not shown in FIG. 3 between the end user interface 302 and translation service 322 for illustrative convenience) in response to the end-user 301 having made a request (such as an HTTP request) to the $3^{rd}$ party translation service 322.

The end user interface 302 is responsible for converting the end-user's "native language" keystroke and mouse-click sequences into appropriate messages 320 that are sent to the $3^{rd}$ party translation service. Note that the end-user interface and overall "native language" presentation need not only employ another language besides the standard format language but may also provide a unique color scheme and/or visual design as compared to the standard format presentation. As such, a complete culture-specific experience can be crafted for the end-user. For convenience the phrase "culture specific", "cultural specific" and the like should be understood to mean "targeted for peoples of a specific demographic". Also, the phrase "native language" will be used to refer to language aspects of a culture-specific experience.

The $3^{rd}$ party translation service 322 is responsible for translating the "native language" messaging 320 into "standard format" messaging 307. The "standard format" messaging 307 is then sent, over the Internet 303, to the on-line auctioneer's application software 304 though its API. By communicating to the on-line auctioneer's application software 304 through the "standard format" API, the on-line auctioneer's application software 304 is able to efficiently control the end-user's presentation experience "as if" the presentation were being rendered in a standard format. As a consequence, only modest overhead or re-design should be introduced to the already existing and functional application software 304.

Likewise, messaging 308 describing changes to the user's presentation experience (e.g., a new web page for viewing in standard API format) are sent in standard format over the Internet 303 from the auctioneer's application software 304 to the third party translation service 322. The third party translation service 322 translates the standard format messaging 308 into messaging 321 that is sent to the end user interface 302 that describes presentation changes in the native language format. The end user interface 302 presents the natural language visual content 306 to the end user 301 so as to make the presentation change(s) visually apparent. As discussed in more detail below, emails 309 may also be exchanged between the end-user and the on line auctioneer by embedding email content through the application software's API flow 307, 308.

Figure 4A:
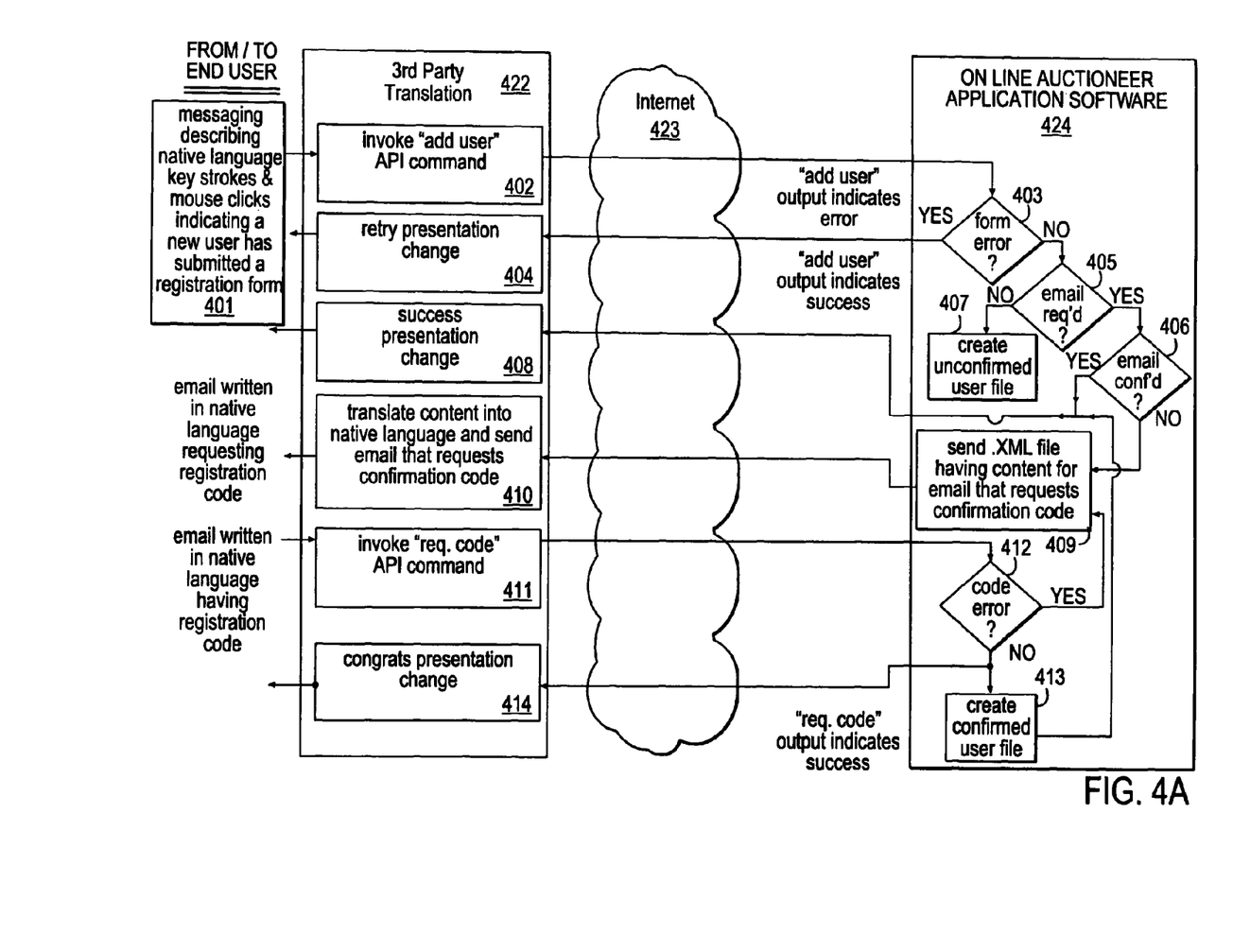
FIG. 4a shows a registration methodology that can be implemented with $3^{rd}$ party translation.
Figure 4B:
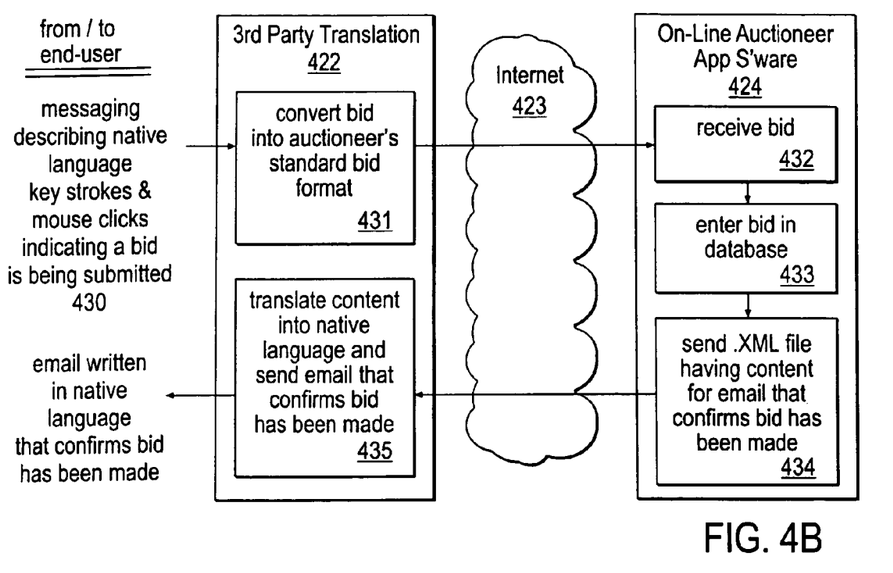
FIG. 4b shows a bidding methodology that can be implemented with $3^{rd}$ party translation.
Figure 4C:
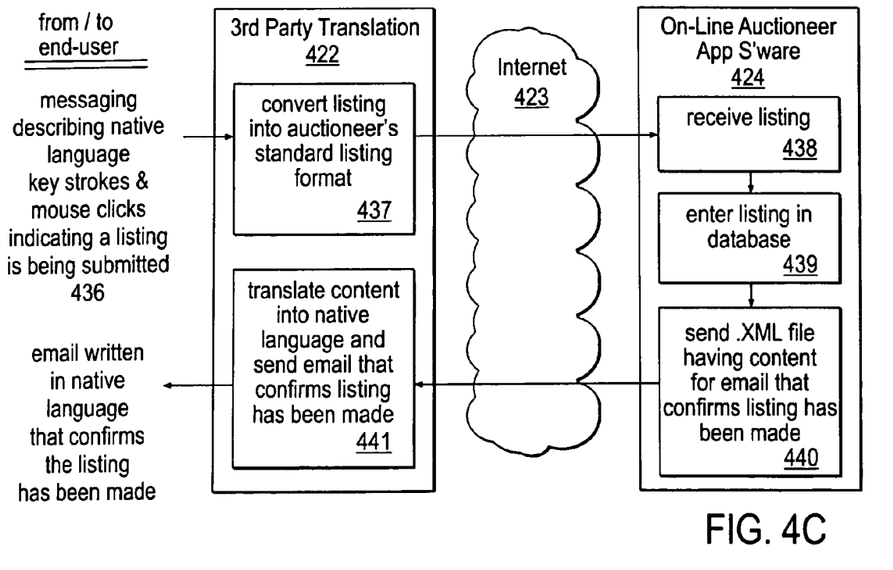
FIG. 4c shows a selling methodology that can be implemented with $3^{rd}$ party translation.

Due to the presence of the 3$^{rd}$ party translation service 322 for those engagements between the on-line auctioneer and an end user interfacing through a cultural specific presentation, basic methodologies (e.g., registration, bidding and selling) will be different than previously implemented. FIGS. 4a, 4b and 4c respectively illustrate exemplary methodologies for registering, bidding and selling through the third party translation service 322. Each of these methodologies may be compared with their prior art counterparts provided in FIGS. 2a, 2b and 2c respectively. Also, due to the fact that the architectural approach of FIG. 3 is different than the architectural approach of FIG. 1, efficiencies in implementation can be gleaned by modifying the standard format API so as to include additional functional calls ("AddUser" and "Reg-Code") that were heretofore not present in the standard format.

By incorporating these additional function calls into the standard format API, pre-existing non cultural specific information flows should not be effected (i.e., as they successfully engaged the auctioneer without referencing the new calls there is no need to cause them to do so after the calls are made available); while, the cultural specific information flows are efficiently engaged. In a sense, the new function calls amount to an upgrade of the API that is downward compatible with its pre-existing uses. Each of the new function calls reference a body of information (a filled out form in the case of the AddUser command and a user specific code in the case of the RegCode command); and, each of the new function calls indicate whether or not there is an error or if the function was successful (i.e., in the case of the AddUser command: if the new user was successfully added to the on-line auctioneer's database resources 315; in the case of the RegCode command: if the registration code matched its looked for value).

Referring to the registration methodology of FIG. 4a, the culture specific end user interface forwards to the 3$^{rd}$ party translation service 422 messaging 401 that describes native language key strokes and mouse clicks indicating a new user has submitted a registration form (or, that the new user has submitted information from which the 3$^{rd}$ party translation software can create filled out registration form). In response to this messaging 401, the 3$^{rd}$ party translation service 422 invokes the AddUser command 402 over the Internet 423 through the standard format API. Note that the AddUser command may refer to a translated version of the newly submitted form (i.e., the 3$^{rd}$ party may perform native language to standard format language translation for a form field requiring it—although typical registration information (e.g., user name, email address, etc.) typically do not require translation).

The on-line auctioneer's application software 424, in response to cognizance of the AddUser command, checks to see if the filled out form referred to by the AddUser command contains any errors 403 (e.g., as just one instance, checks to see if all required fields have been filled out). If the form has errors the application software 424 sends an AddUser function call output back to the 3$^{rd}$ party translation service 422 that indicates an error condition. In response, the 3$^{rd}$ party translation service 422 directs a native language compatible "retry" presentation change 404 to the end user interface that informs the end-user the registration form must be re-submitted due to error.

If there is no error in the registration form the application software 424 inquires to see if the new user is email registered 405. If the user is not email registered an unconfirmed user file is created 407. If the user is email registered a second inquiry 406 is made to see if the user has been email confirmed. If so, the application software 424 sends an AddUser function call output back to the 3$^{rd}$ party translation service 422 that indicates the end-user is presently formally recognized by the auctioneer. In response, the 3$^{rd}$ party translation service 424 directs a native language compatible "success" presentation change 408 to the end user interface that informs the end-user that the end-user is formally recognized by the auctioneer.

If the user is not email registered or is not email confirmed, content for an email to be sent to the end user from the 3$^{rd}$ party translation service 422 and that requests the end user to send his/her confirmation code is sent to the 3$^{rd}$ party translation service 422 by the application software 424 through the API. For example, according to the specific embodiment of FIG. 4a, an .XML file is sent 409 to the third party translate service 422; where, the .XML file includes a message written in the standard language format that asks the user to send his/her confirmation code. In response to receipt of this file, the 3$^{rd}$ party translation service 422 translates the message from the standard format language to the native language and sends an email to the end user having the native language message 410.

In response to the reception of the email, the end-user sends an email to the 3rd party translation service 422 that includes the user's confirmation code. In response, the 3rd party translation service invokes the RegCode command 411 (which includes as an operand the user supplied confirmation code) through the application software's API. In response, the application software 424 checks if the submitted code is the correct code 412 (e.g., as compared to that submitted in the form). If not, content for another email requesting the code 409 and a RegCode command output that indicates the code conformation was not successful is sent to the 3rd party translation service 422 through the API 308. If the submitted code is the correct code, a RegCode output indicating success is sent to the 3rd party translation service 422 over the API; which, in turn, causes a native language compatible "congratulations" presentation change to be presented to the end user 414. Since the registration code sequence is part of the add user sequence, a correct code also causes an outstanding AddUser command output indicating success to be sent back to the translation service 422.

FIG. 4b shows an exemplary process for making a bid through a 3$^{rd}$ party translation service. According to the process of FIG. 4b, messaging 430 describing native language key strokes and mouse clicks that indicate a bid for an item for sale is being made through a native language interface. The 3$^{rd}$ party translation service converts 431 the natural language bid into a standard format bid that is sent through the application software 424 API. Upon being cognizant of the bid's reception 432, the application software enters 433 the bid into a database where records of bids for items for sale are stored; and, sends 434 content through the API (e.g., an .XML file) to the translation service 422 that informs the end user in the standard language format that the bid has been entered 434. In response, the translation service 422 translates 435 the standard format language content into native language content that is embedded into an email and sent to the end user.

FIG. 4c shows an exemplary process for making a listing (or sale) through a 3$^{rd}$ party translation service. According to the process of FIG. 4c, messaging 436 describing native language key strokes and mouse clicks that indicate a listing of an item for sale is being made through a native language interface. The 3$^{rd}$ party translation service converts 437 the natural language listing into a standard format bid that is sent through the application software 424 API. Upon being cognizant of the listing's reception 438, the application software enters 439 the listing into a database where records of items for sale are stored; and, sends 440 content through the API (e.g., an .XML file) to the translation service 422 that informs the end user in the standard language format that the listing has been entered 434. In response, the translation service 422 translates 441 the standard format language content into native language content that is embedded into an email and sent to the end user.

Figure 5:
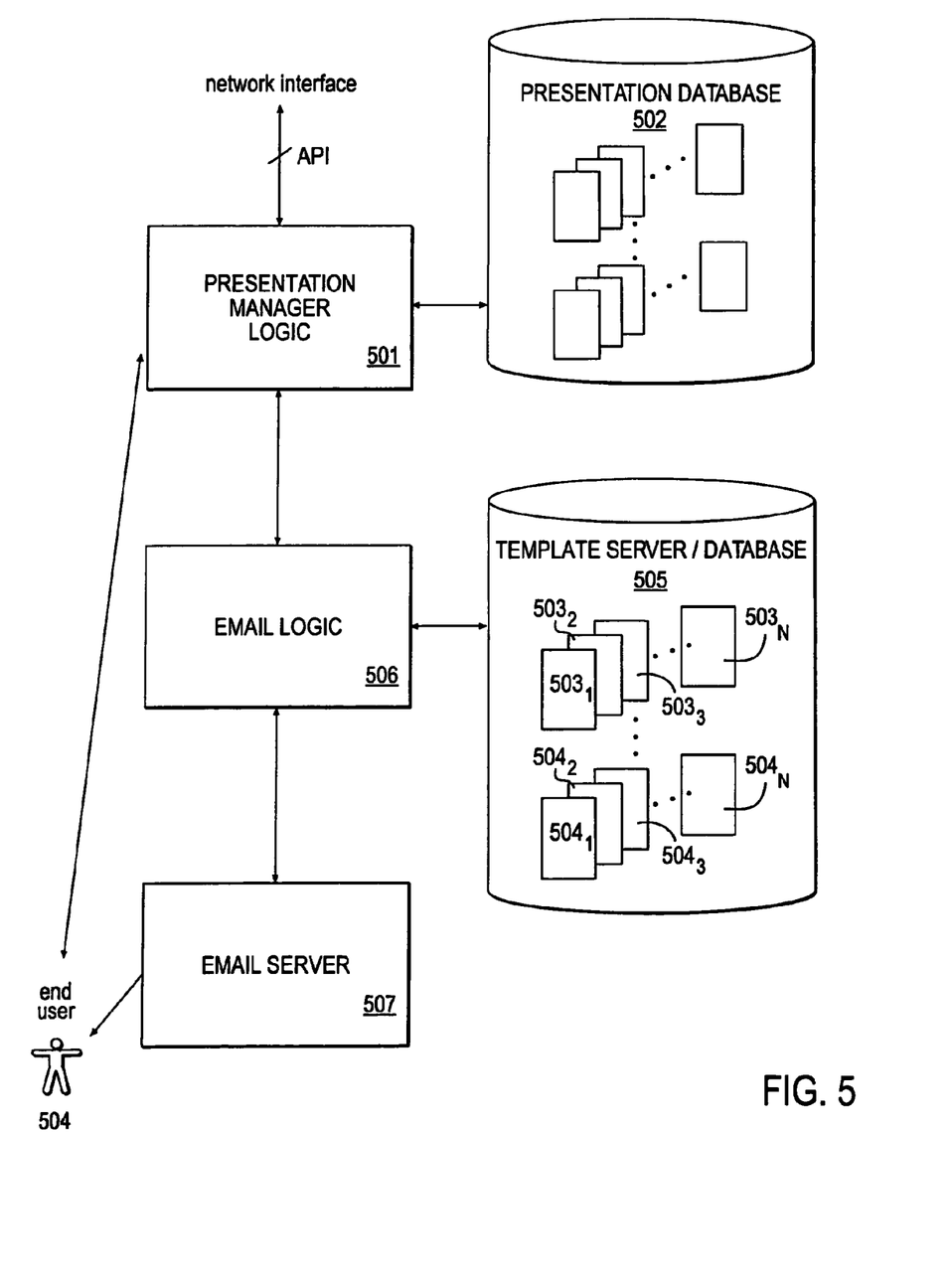
FIG. 5 shows a possible architecture for a $3^{rd}$ party translation service.

FIG. 5 shows an exemplary architecture for a $3^{rd}$ party translation service. The $3^{rd}$ party translation service includes presentation manager logic software 501 which controls the sequence of presentation changes made to an end-user (e.g., as observed in FIG. 4a with respect to sequences 404, 408, 414) as well as controls the standard format API signaling. The presentation manager software 501 is communicatively coupled to email logic software 506 which performs email content translation services in both directions. The email logic software 506 is likewise communicatively coupled to an email server 507 which constructs email messages and sends them to the end user 504; and, receives email messages from the end user 504 and forwards their content to the email logic software 506.

Note that the email logic software 506 has access to a database 505 where email templates $503_1$ through $503_N$, $504_1$ through $504_N$ can be stored. Email templates can be used as a tool during the translation process. Specifically, the translated version of a specific message may be stored in the database 505 and called upon as needed. For example, the templates $503_1$ through $503_N$ may include: 1) a first template having native language content for an email asking the user to send his/her confirmation code; 2) a second template having native language content for an email informing the user that a bid was entered; 3) a third template having native language content for an email informing the user that a listing was entered, etc. Thus, for example, if an email needs to be sent to user that informs a user that a bid was successful, the email logic software 506 fetches the second template from the database 505.

Here the templates may include not only natural language content but also fields for entering custom/per-user information (such as user name, user code, etc.). Note also that, by looking up email templates as described just above, the language content sent through the API from the auctioneer to the $3^{rd}$ party translation source may be replaced by a reference number that identifies which type of message is to be sent to the end user. By looking up the proper template with the reference number, translation is effectively performed. Templates having standard format language content may also be used to construct emails flowing into the on line auctioneer's application software.

The presentation manager software 501 is also observed to be communicatively coupled to a presentation database 502 that stores the culture specific/natural language web pages that can be presented to an end user. Here, note that the architecture of FIG. 5 is efficient in that it can support different cultural specific experiences. For example, a collection of IS resources orchestrated into the architecture of FIG. 5 could serve each of a number of proximately located regions having their own unique culture. For example, in area such as the Balkans or thereabouts where multiple small markets having a complex mix of cultures and corresponding languages (e.g., Croatian, Serbian, Bulgarian, Greek, Albanian) and alphabets (Latin, Cyrillic, Greek, Arabic) are found, the architecture of FIG. 5 could be used to simultaneously serve each of these small markets by having a family of templates for each unique experience (e.g., a Croatian family of templates, a Serbian family of templates, etc.).

Because various methodologies described herein can be implemented with software routines it is to be understood that aspects of this invention may be used as or to support a software program executed upon some form of processing core (such as the Central Processing Unit (CPU) of one or more computing systems) or otherwise implemented or realized upon or within a machine readable medium. A machine readable medium includes any mechanism for storing or transmitting information in a form readable by a machine (e.g., a computer). For example, a machine readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Figure 6:
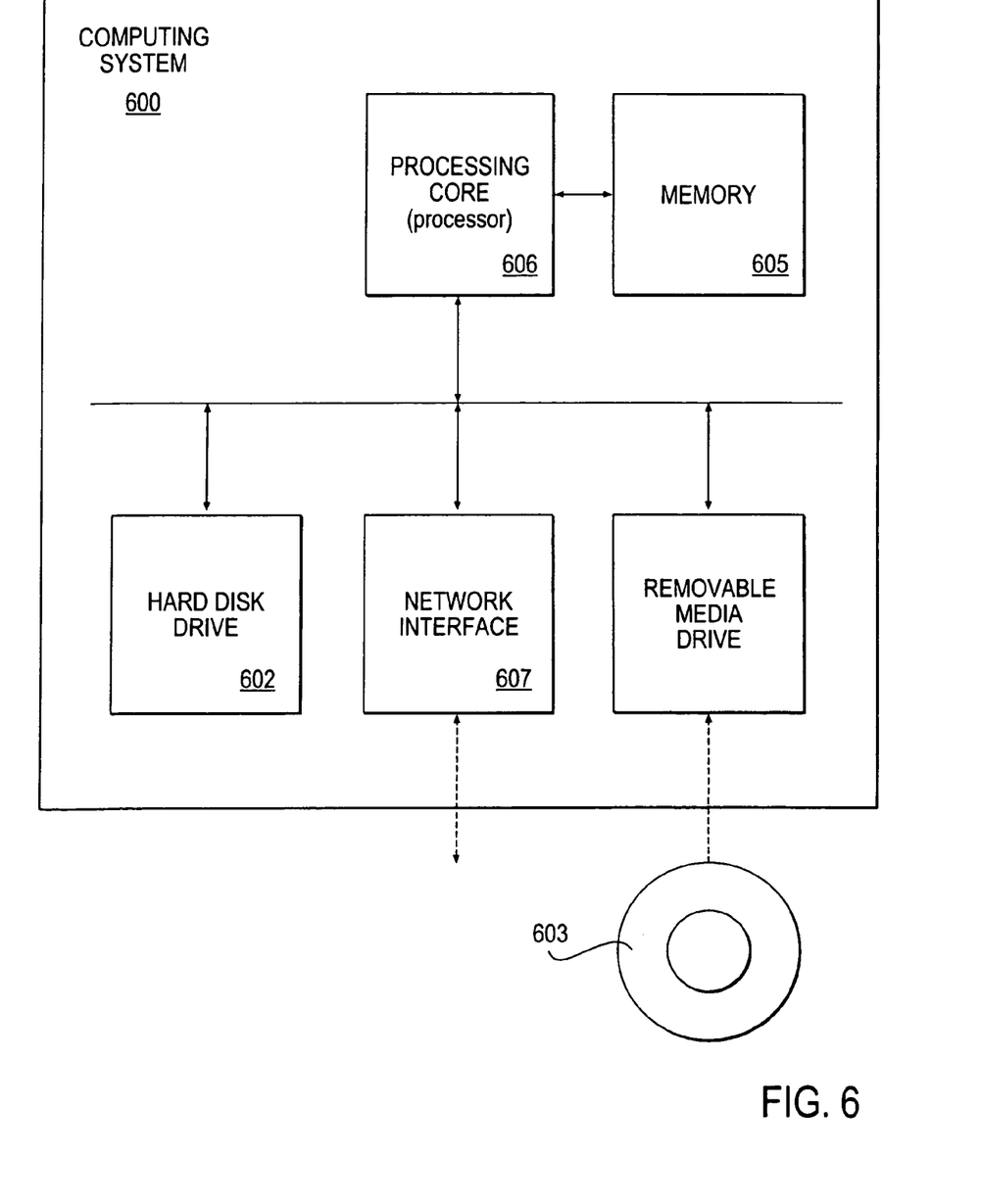
FIG. 6 shows an embodiment of a computing system.

FIG. 6 shows an embodiment of a computing system 600 that can execute instructions residing on a machine readable medium (noting that other (e.g., more elaborate) computing system embodiments are possible). In one embodiment, the machine readable medium may be a fixed medium such as a hard disk drive 602. In other embodiments, the machine readable medium may be movable such as a CD ROM 603, a compact disc, a magnetic tape, etc. The instructions (or portions thereof) that are stored on the machine readable medium are loaded into memory (e.g., a Random Access Memory (RAM)) 605; and, the processing core 606 then executes the instructions. The instructions may also be received through a network interface 607 prior to their being loaded into memory 605.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

The invention claimed is:

1. A method comprising:
    receiving a native language message from a cultural specific user interface, the cultural specific user interface capable of receiving an interaction from an end-user in a native language and generating the native language message, the native language message including an action request for an application in the native language, the application associated with a provider;
    generating, using one or more processors, a provider-format message based on the native language message, the provider-format message including the action request in a provider language; and
    providing the provider-format message to the application, the application being able to process the action request in the provider language, and the application being unable to process the action request in the native language.

2. The method of claim 1, wherein the generating of the provider-format message comprises:
    identifying a native language template associated with the native language message; and
    accessing a provider-format template corresponding to the native language template, the provider-format template capable of being used as the provider-format message.

3. The method of claim 1, wherein the generating of the provider-format message comprises:

identifying a native language template associated with a first portion of the native language message;

accessing a provider-format template corresponding to the native language template;

translating a second portion of the native language message into the provider language; and combining the provider-format template and the translated second portion of the native language message.

4. The method of claim 1, wherein the providing of the provider-format message comprises:

providing the provider-format message to the application via a provider-format API.

5. The method of claim 1, wherein the native language message includes a bid for an item.

6. The method of claim 1, wherein the native language message includes a listing of an item for sale.

7. The method of claim 1, wherein the native language message includes new user registration information.

8. A method comprising:

receiving a provider-format message from an application over a network, the application associated with a provider, the provider-format message including a provider presentation change to a provider-format user interface;

generating, using one or more processors, a native language message based on the provider-format message, the native language message including a corresponding presentation change to a cultural specific user interface; and providing the native language message to the cultural specific user interface, the cultural specific user interface being capable of using the native language message to present the corresponding presentation change to a user.

9. The method of claim 8, wherein the generating of the native language message comprises:

identifying a provider-format template associated with the provider-format message; and accessing a native language template corresponding to the provider-format template, the native language template capable of being used as the native language message.

10. The method of claim 8, wherein the generating of the native language message comprises:

identifying a provider-format language template associated with a first portion of the provider-format message;

accessing a native language template corresponding to the provider-format template;

translating a second portion of the provider-format message into a native language; and combining the native language template and the translated second portion of the provider-format message.

11. The method of claim 8, wherein the corresponding presentation change includes visual content in a native language.

12. The method of claim 8, wherein the corresponding presentation change presented by the cultural specific user interface includes at least one of:

a native language other than a provider language supported by the application, a different color scheme than a provider color scheme supported by the application, a different design than a provider design supported by the application, and combinations thereof.

13. The method of claim 8, wherein the corresponding presentation change is tailored for a particular culture.

14. The method of claim 8, wherein the native language message includes a description of the corresponding presentation change to the cultural specific user interface in an API-compatible format.

15. The method of claim 8, wherein the application includes at least one of an auction application, a commerce application, and combinations thereof.

16. A machine-readable medium comprising instructions, which when executed by one or more processors perform operations comprising:

receive a native language message from a cultural specific user interface, the cultural specific user interface capable of receiving an interaction from an end-user in a native language and generating the native language message, the native language message including an action request for an application in the native language, the application associated with a provider;

generating a provider-format message based on the native language message, the provider-format message including the action request in a provider language; and provide the provider-format message to the application in a network, the application capable of processing the action request in the provider language, wherein the application is unable to process the action request in the native language.

17. The machine-readable medium of claim 16, wherein instructions to generate the provider-format message include:

identify a native language template associated with the native language message; and access a provider-format template corresponding to the native language template, the provider-format template capable of being used as the provider-format message.

18. A machine-readable medium comprising instructions, which when executed by one or more processors perform operations comprising:

receive a provider-format message from an application over a network, the application associated with a provider, the provider-format message including a provider-format presentation change to a provider-format user interface;

generate a native language message based on the provider-format message, the native language message including a corresponding presentation change that corresponds to the provider-format presentation change; and provide the native language message to a cultural specific user interface, the cultural specific user interface being capable of using the native language message to present the corresponding presentation change to a user.

19. The machine-readable medium of claim 18, wherein the provider-format message is in a provider language of the application and the native language message is in a native language.

20. The machine-readable medium of claim 18, wherein the corresponding presentation change presented by the cultural specific user interface includes at least one of:

a native language other than a provider language supported by the application, a different color scheme than a provider color scheme supported by the application, a different design than a provider design supported by the application, and combinations thereof.

* * * * *